United States Patent [19]

Sollars

[11] Patent Number: 4,999,488

[45] Date of Patent: Mar. 12, 1991

[54] METHOD TO CONTINUOUSLY COUNT THE COURSES OR PICKS OF A MOVING FABRIC

[75] Inventor: John A. Sollars, LaGrange, Ga.

[73] Assignee: Milliken Research Corporation, Spartanburg, S.C.

[21] Appl. No.: 471,642

[22] Filed: Jan. 29, 1990

[51] Int. Cl.⁵ .............................................. G01V 9/04
[52] U.S. Cl. .................................. 250/222.2; 356/429
[58] Field of Search ........ 250/222.2, 227.21, 559–562, 250/571, 572; 356/237, 238, 371, 429, 430; 377/53

[56] References Cited

U.S. PATENT DOCUMENTS

| | | | |
|---|---|---|---|
| 3,030,853 | 4/1962 | Strother | 356/431 |
| 3,496,366 | 1/1970 | Hunziker et al. | 250/571 |
| 3,800,160 | 3/1974 | Ishizawa et al. | 250/222.2 |
| 4,019,066 | 4/1977 | Lucas et al. | 356/429 |
| 4,057,350 | 11/1977 | Craig | 356/429 |
| 4,124,300 | 11/1978 | Mead et al. | 356/429 |
| 4,270,252 | 6/1981 | Harrison et al. | 356/429 |
| 4,274,746 | 6/1981 | Cardell et al. | 250/572 |
| 4,277,178 | 7/1981 | Cushing et al. | 250/571 |
| 4,384,596 | 5/1983 | Brouwer et al. | 250/571 |
| 4,471,816 | 9/1984 | Wada | 250/571 |
| 4,550,377 | 10/1985 | Craemer | 250/571 |
| 4,800,286 | 1/1989 | Brears | 250/559 |
| 4,887,155 | 12/1989 | Massen | 250/560 |

FOREIGN PATENT DOCUMENTS

| | | | |
|---|---|---|---|
| 1130202 | 5/1962 | Fed. Rep. of Germany | 356/242 |
| 1274801 | 9/1961 | France | 356/242 |
| 454476 | 1/1975 | U.S.S.R. | 356/242 |

Primary Examiner—David C. Nelms
Assistant Examiner—Stephone B. Allen
Attorney, Agent, or Firm—Earle R. Marden; H. William Petry

[57] ABSTRACT

A method to count the courses and/or picks of a moving fabric by utilizing a fiber optic device to shine light on a fabric and detect the reflectance of same to provide a signal for comparison with the rate of travel of the fabric to provide a continuous count of the courses and/or picks of the fabric.

2 Claims, 1 Drawing Sheet

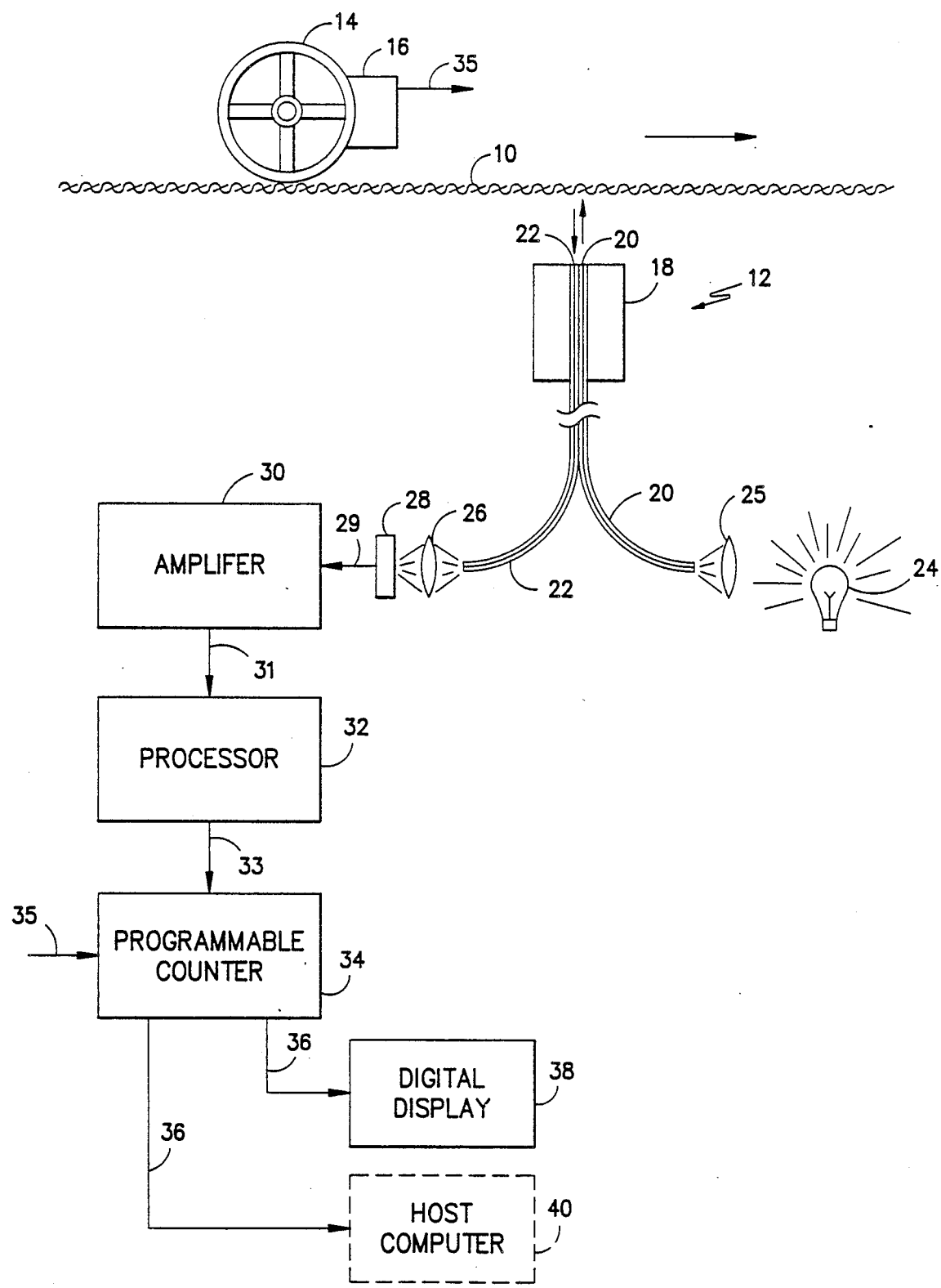

METHOD TO CONTINUOUSLY COUNT THE COURSES OR PICKS OF A MOVING FABRIC

This invention relates to a system to ascertain the courses per inch of a knit fabric of the picks per inch if a woven fabric by a stationary device observing the fabric as it passes thereby.

It is an object of the invention to provide a system to acurrately measure the courses or picks per inch of a moving fabric to provide a signal which can be utilized to evaluate the production of a desired fabric.

Other objects and advantages of the invention will become readily apparent as the specification proceeds to describe the invention with reference to the accompanying drawings which schematically represent the preferred system employed in the invention.

In the drawing, reference mumber 10 represents a knitted or woven fabric moving past a detector 12 to have its courses or picks per inch detected. A conventional measuring wheel 14 connected to a pulse generator 16 is shown in contact with the surface of the fabric 10 to measure the rate of fabric travel. The fabric 10 is moving in the direction indicated by the arrow and the detector 12 is located on either side of the fabric.

Mounted on either side of the path of travel of the fabric 10 is the detector 12 which basically consists of a mounting block 18 which supports two sets 20 and 22 of fiber optic strands. Both sets of strands are intermixed and arranged in the form of an elongated rectangle. Set 20 receives light from a light source 24 supplying light through a convergence device 25 and directs it against the fabric 10. Set 22 receives the light from the set 20 which is reflected from the fabric and supplies it through a convergence device 26 to a silicon photodiode detector 28 which converts the light signal to a current output 29. The current from detector 28 is supplied to an amplifier 30 which converts it to a voltage signal 31 and supplies the voltage signal 31 to the processor 32 which converts the small variations in the voltage signal 31 to a series of digital pulses 33 corresponding to rate of passage of the courses. The signal 33 from the processor 32, along with the signal 35 from the pulse generator 16, are delivered to the programmable counter 34 which compares the rate of travel of the fabric to the light reflectance signals from the detector to provide an output 36 indicating the course or pick count of the fabric 10 which can be supplied to a digital display 38, a host computer 40 for monitoring or to devices to automatically control the process.

As described above, as the fabric moves across the light beam from the fiber optic strands 20, the surface texture of the fabric directly in the beam will change due to the nature of the fabric construction. This regularly repeating change in texture will likewise cause a corresponding change in the reflectivity of the line of light focused on the fabric. This provides a continuous observation of the courses or picks in the fabric observed to provide the operator and/or the control system and machinery producing such information necessary to make corrections if required.

Although the preferred embodiment of the invention has been described, it is contemplated that changes may be made without departing from the scope or spirit of the invention and it is desired that the invention be limited only by the claims.

I claim:

1. A method to continuously count the courses or picks of a moving fabric comprising the steps of: supplying a running length of knit or woven fabric, measuring the rate of travel of the fabric and generating a first signal, placing a bundle of fiber optic strands adjacent one side of the fabric, supplying light from a light source through a portion of the fiber optic strands, reflecting a portion of the supplied light back from the fabric through another portion of the fiber optic strands to an amplifier to produce a second signal, supplying the signal from the amplifier and the first signal to a programmable counter to produce a signal equivalent to the course or pick count of the fabric and supplying the produced signal to a point of use.

2. The method of claim 1 wherein there are variations in the reflected light to the amplifier causing variations in the output of the amplifier and the rate of such variations is processed to produce the second signal.

* * * * *